United States Patent [19]
Argade

[11] Patent Number: 6,151,386
[45] Date of Patent: *Nov. 21, 2000

[54] TECHNIQUE FOR EFFICIENTLY ACCESSING TELEPHONE MESSAGES

[75] Inventor: Pramod Vasant Argade, Allentown, Pa.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/795,996

[22] Filed: Feb. 5, 1997

[51] Int. Cl.$^7$ ...................................... H04M 1/64

[52] U.S. Cl. ...................... 379/88.26; 379/70; 379/88.27

[58] Field of Search .................................. 379/70, 71, 72, 379/75, 77, 88.26, 88.27, 88.09, 88.11

[56] References Cited

U.S. PATENT DOCUMENTS

| | | | |
|---|---|---|---|
| 4,757,525 | 7/1988 | Matthews et al. | 379/198 |
| 4,837,798 | 6/1989 | Cohen et al. | 379/396 |
| 4,850,005 | 7/1989 | Hashimoto . | |
| 4,853,952 | 8/1989 | Jachmann et al. | 379/96 |
| 5,003,574 | 3/1991 | Denq et al. . | |
| 5,572,576 | 11/1996 | Klauener et al. | 379/354 |
| 5,907,320 | 5/1999 | Beesley et al. | 345/302 |

*Primary Examiner*—Fan S. Tsang

[57] ABSTRACT

In a telephone answering system, announcements are prerecorded to elicit from a caller one or more attributes and details of a message. Such attributes may include the identity of the caller, the purpose of the call, etc. Information concerning each attribute of the message is stored in the system separate from the message details. By reviewing at least one attribute of each message saved on the system, the called party is able to identify any messages of interest before listening to any message details. The called party may then retrieve the message details of each identified message.

29 Claims, 2 Drawing Sheets

TECHNIQUE FOR EFFICIENTLY ACCESSING TELEPHONE MESSAGES

FIELD OF THE INVENTION

The invention relates to communications systems and methods, and more particularly to telephone answering systems and methods for storing and retrieving messages.

BACKGROUND OF THE INVENTION

It is well-known that a telephone answering machine allows for recording of messages from callers in response to an announcement previously recorded by the called party. The called party may retrieve the messages from the machine in the order of receipt.

Analog answering machines are common which incorporate cassette tape recording equipment for recording the announcement and messages. With the advent of technology, digital answering machines have emerged. A digital answering machine includes a coder for converting an analog speech to digital data representative thereof, and a voice synthesizer for synthesizing the analog speech based on the digital data. Using the coder, the machine can digitize the announcement and messages, and store the corresponding digital data in a memory. By retrieving the stored data and using the voice synthesizer, the machine can play back the corresponding announcement to callers and messages to the called party. Unlike an analog answering machine, a digital answering machine has no moving tape recording part, thereby affording a quieter operation and faster access to the announcement and messages.

Systems using information in voice messages to help process transactions such as taking customers' orders are known. One such system is disclosed in U.S. Pat. No. 5,003,574 issued Mar. 26, 1991 to Denq et al. The Denq system records and digitizes voice messages by customer-callers containing order information. Certain recognized terminology in the digitized messages is stored in file records corresponding thereto. In processing the customers' orders, as each digitized message is retrieved in the order of receipt, the corresponding file record terminology is displayed on a transcribing terminal in the system, filling part of a predefined order template. The digitized message is received by an operator at the transcribing terminal as an audio message, and the operator completes the rest of the template using information contained in the audio message.

SUMMARY OF THE INVENTION

The telephone answering systems just described are helpful in communicating information by leaving messages to a called part who is unavailable to answer calls. With such prior art systems, the called party retrieves the messages by playing them back in the order of receipt. Specifically, the called party has to listen to a substantial portion, if not the entirety, of each message in a queue to understand its context before he/she skips to the next message. The prior art systems are adequate only if the messages are of equal importance, which however is unusual. Thus, with such systems, it may take too long for the called party to reach and respond to messages of particular interest or urgency if such messages are not close to the beginning of the queue or if the intervening messages are lengthy.

The present invention overcomes the prior art limitations by allowing the called party to retrieve selected messages based on at least one attribute thereof. For example, the attribute may contain information on the identity of a caller. The attribute of each message and the message details may be elicited from the caller and stored in different preselected memory spaces. In accordance with the invention, each attribute is retrievable separately from the details of the message associated therewith. The called party is able to review each attribute to decide whether he/she wants to retrieve the associated message details or skip same. Thus, with the invention, the called party can efficiently locate and access any message of interest.

DETAILED DESCRIPTION

Figure 1:
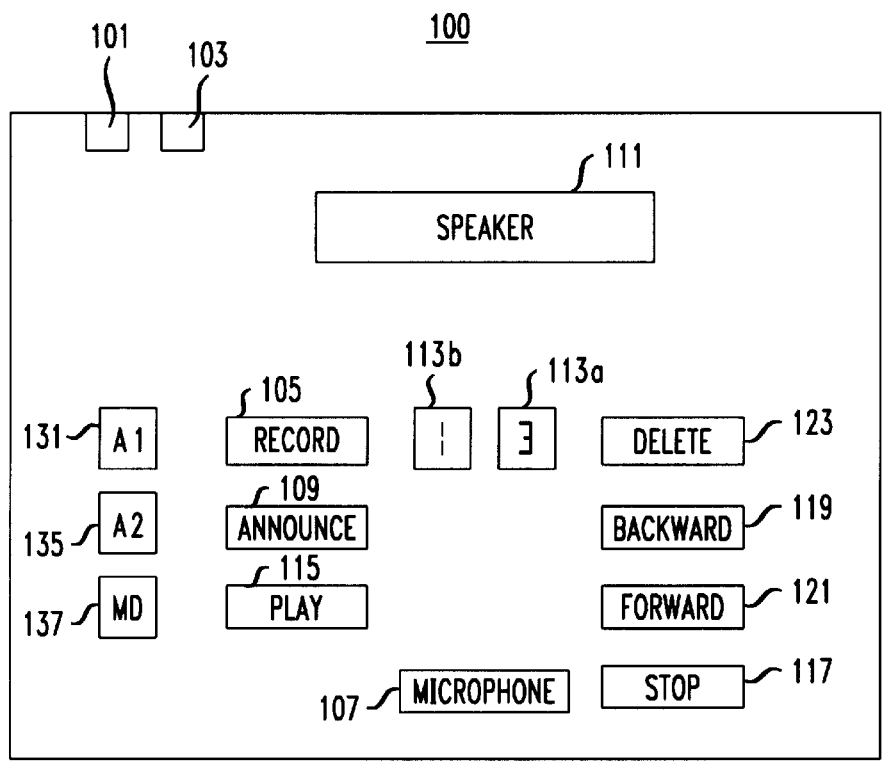
FIG. 1 illustrates an operating portion of a telephone answering system in accordance with the invention.
Figure 2:
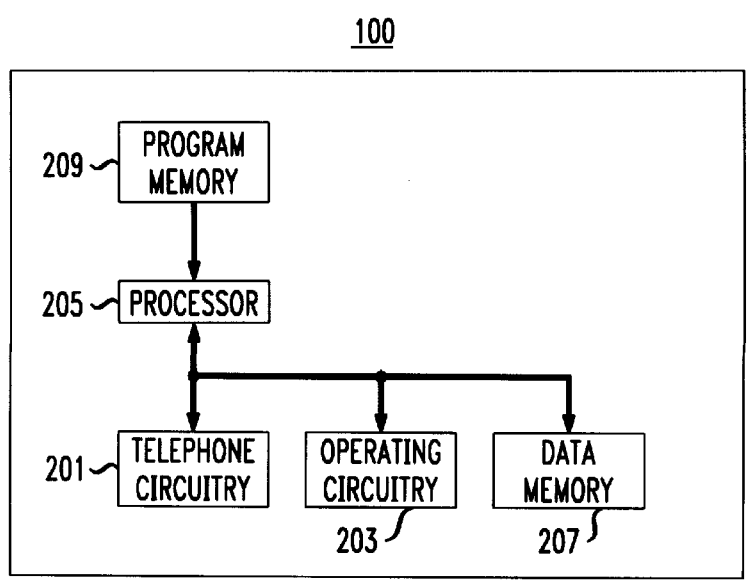
FIG. 2 is a schematic of the inventive system.

FIGS. 1 and 2 jointly illustrate telephone answering system 100 embodying the principles of the invention. FIG. 1 shows an operating portion of system 100, and FIG. 2 shows a schematic of the system. In system 100, line connector 101 in FIG. 1 provides an interface for telephone circuitry 201 in FIG. 2 to be connected to an external telephone line (not shown). Telephone connector 103 provides an interface for telephone equipment such as a conventional analog telephone set (not shown) to be connected to system 100. Telephone connector 103 is also connected to telephone connector 101 to allow the telephone equipment to transmit and receive calls through the external telephone line.

Traditionally, when the telephone equipment connected to an answering machine is not answering a call, the machine intervenes and picks up the call. In response to a prerecorded announcement played by the answering machine, the caller may record thereon a message for the called party. The number of messages on the machine increases over time. The called party is able to retrieve the recorded messages by playing them back in the order of receipt. However, the called party normally has to listen to a substantial portion, if not the entirety, of each message in a queue to understand its context before he/she skips to the next message. As a result, it may take too long for the called party to reach and respond to messages of particular interest or urgency if such messages are not close to the beginning of the queue or if the intervening messages are lengthy. Thus, this prior art message retrieval practice proves to be inefficient.

In accordance with the invention, system 100 is designed to be capable of eliciting from a caller certain attributes of a message which a caller is about to leave, along with the message details. Such attributes may include, for example, information on the name of the caller, the purpose of the call, etc. System 100 also allows the called party to retrieve selected messages by first reviewing one or more of the attributes thereof. In order to more appreciate the invention, an exemplary calling session wherein system 100 elicits from a caller attributes and details of a message is illustrated as follows:

1. The telephone equipment connected to system 100 rings and does not answer the call.
2. System 100 answers the call with a greeting including a question on a first attribute of the message, "We cannot come to the phone right now. Please respond to the following questions if you want to leave a message. [Pause.] Who is calling please?"

3. The caller identifies himself/herself, e.g., "Mary."

4. System 100 stores the information on the first attribute of the message, i.e., the caller identity information.

5. System 100 continues with a second attribute question, "What is this call about?"

6. The caller states the purpose of the call, e.g., "Home insurance."

7. System 100 stores the information on the second attribute of the message, i.e., the call purpose information.

8. System 100 then prompts for message details, "Please leave the details of the message now."

9. The caller leaves the message details.

10. System 100 stores the message details.

While the above sequence of operations is representative, still other options may be included, or various portions omitted, as will be apparent in the following discussion. In any event, to realize such a sequence, system 100 in accordance with the invention provides Attribute 1 (A1) key 131 associated with a first attribute of the message, Attribute 2 (A2) key 135 associated with a second attribute of the message, and Message Details (MD) key 137 associated with the details of the message, all of which are connected to operating circuitry 203. For example, by pressing A1 key 131, followed by Record key 105 also connected to circuitry 203, the user is able to record the greeting including the first attribute question, "We cannot come to the phone . . . Who is calling please?" in step 2.

Specifically, upon detecting the sequential depression of keys 131 and 105 through circuitry 203, processor 205 causes the circuitry to be receptive to an audio signal representative of the greeting by the user through microphone 107. The received audio signal in an analog form is digitized by a conventional coder (not shown) in circuitry 203 in a well-known manner. The resulting digital data representing the greeting is then stored in data memory 207 for a later retrieval. Illustratively, data memory 207 is a conventional volatile or non-volatile static random access memory (SRAM).

Similarly, by pressing A2 key 135, followed by key 105, the user is able to record the second attribute question, "What is this call about?" in step 5. By pressing MD key 137, followed by key 105, the user is able to record the prompt, "Please leave the details of the message now." in step 8.

To verify or re-listen to one of the above recorded announcements, the user may press the corresponding one of keys 131, 135 and 137, followed by Announce key 109 connected to operating circuitry 203. Upon detecting the depression of one such key combination, processor 205 retrieves from memory 207 the digital data representing the recorded announcement associated with the leading key (i.e., key 131, 135 or 137). The retrieved data is fed to a conventional voice synthesizer (not shown) in circuitry 203. A synthesized version of the announcement is then generated through speaker 111.

Figure 3:
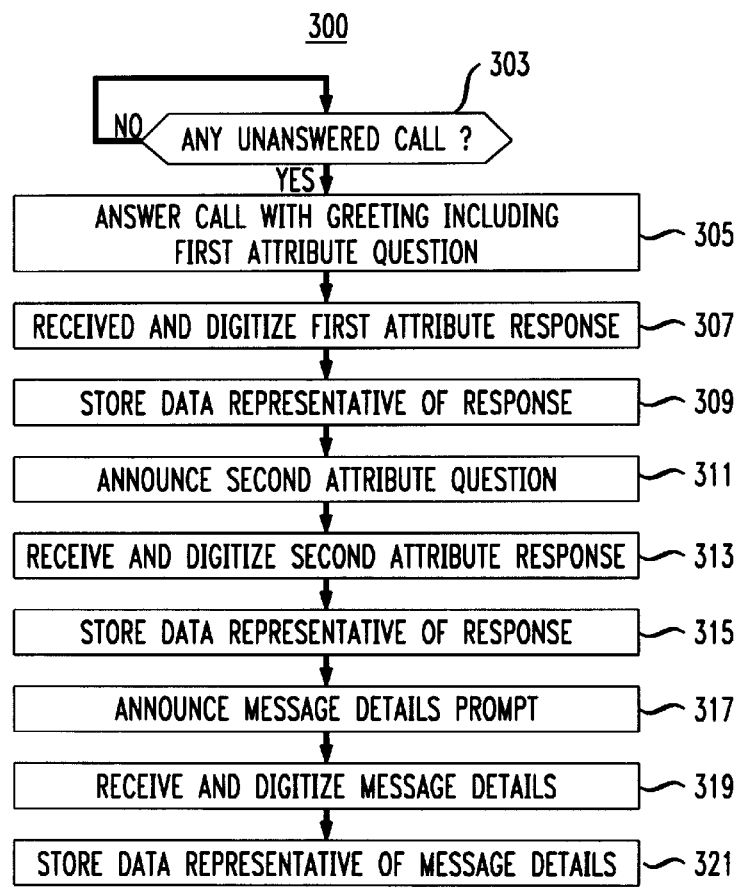
FIG. 3 is a flow chart depicting the steps of an operating routine in the inventive system.

FIG. 3 is a flow chart depicting operating routine 300 stored in program memory 209 for carrying out the aforementioned sequence of operations. Illustratively, program memory 209 is a conventional read-only memory (ROM). Instructed by operating routine 300, processor 205 monitors any call unanswered by the connected telephone equipment, as indicated at step 303. Specifically, telephone circuitry 201 in a well-known manner senses from the telephone line a ringing signal associated with an incoming call. Upon detection of a predetermined number of occurrences of the ringing signal through circuitry 201, processor 205 determines that the telephone equipment is not being answered. If that is the case, routine 300 proceeds to step 305 where processor 205 causes telephone circuitry 201 to answer the call with the recorded greeting in a synthesized voice, including the first attribute question (i.e., "We cannot come to the phone . . . Who is calling please?").

In response to such a greeting, the caller in this example answers, "Mary." Operating circuitry 203 receives from telephone circuitry 201 an audio signal representing the name attribute of the message, and digitizes same, as indicated at step 307. The resulting digital data representing "Mary" is stored in memory 207, as indicated at step 309.

Figure 4:
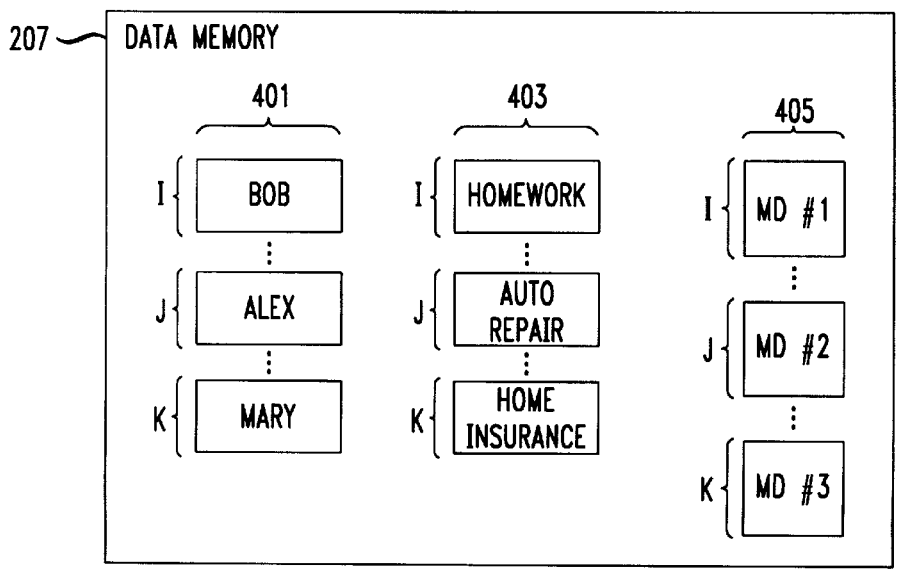
FIG. 4 illustrates a memory space for storing telephone messages in the inventive system.

FIG. 4 illustrates a portion of memory 207 for storing the caller's attribute and message details information. In accordance with the invention, memory blocks 401, 403 and 405 are allocated for storing the first attribute, second attribute and message details information, respectively. Memory segments, denoted I, J and K, are defined in each block such that the ensemble of segments I across the blocks corresponds to a first message; the ensemble of segments J thereacross corresponds to a second message; and the ensemble of segments K thereacross corresponds to a third message.

In this illustration, the message being recorded is preceded by two earlier messages. The data representing the name attribute of the first message (in this instance "Bob") is stored in segment I of memory block 401. The data representing the name attribute of the second message ("Alex") is stored in segment J of the same block. The above name attribute data representing "Mary" is stored in segment K of same.

After step 309, upon detecting by operating circuitry 203 silence following the first attribute response, "Mary.", processor 205 at step 311 announces the pre-recorded, second attribute question in a synthesized voice, "What is this call about?" In response to such a question, the caller in this example answers, "Home insurance." In the manner described above, the audio signal representing the call purpose attribute of the message is received and digitized, as indicated at step 313. Similarly, the resulting digital data representing "Home insurance" at step 315 is stored in segment K of memory block 403. As mentioned before, block 403 corresponds to the second, call purpose attribute of a message. In this instance, the data representing the call purpose attribute of the first message (in this instance "Homework") and that of the second message ("Auto repair") are stored in segments I and J of memory block 403, respectively.

Again, upon detecting by operating circuitry 203 silence following the second attribute response, processor 205 at step 317 announces the pre-recorded message details prompt in a synthesized voice, "Please leave the details of the message now." In response to such a prompt, the caller in this example utters the message details, denoted MD #3. In the manner described above, the audio signal representing MD #3 is received and digitized, as indicated at step 319. Similarly, the resulting digital data representing MD #3 is stored in segment K of memory block 405, as indicated at step 321. As mentioned before, block 405 corresponds to the details of a message. In this instance, the data representing the message details of the first message, denoted MD #1, and that of second message, denoted MD #2, are stored in segments I and J of memory block 405, respectively. It should be noted at this point that each memory segment of block 405 is allocated more memory space than that of block 401 or block 403, in anticipation of a larger amount of data to be stored there. However, the actual memory allocation may be fixed or dynamic.

Additional messages, if any, subsequent to the current message are similarly saved by system 100 in accordance with routine 300. The total number of messages thus saved by system 100 is indicated by display 113a (e.g., a conventional seven-segment display or liquid crystal display (LCD)) connected to operating circuitry 203. In this instance, display 113a shows a numeral "3", indicating that three messages (i.e., Bob's, Alex's and Mary's) have been saved by system 100. Display 113b, structurally similar to display 113a, identifies the current message ready to be retrieved. In this instance, display 113b displays a numeral "1", indicating that the first message is ready to be retrieved.

With system 100, the user is able to access the messages in an efficient manner. For example, the user in this instance expects an important message left by a garage on system 100 about his/her car repair. In addition, the user does not know the name of the mechanic who might call. Thus, in this example, the user would want to review the call purpose attribute of each stored message to identify any such message. As mentioned before, the call purpose attribute corresponds to the second attribute of a message. In accordance with the invention, system 100 allows the user to play back the second attribute information by pressing A2 key 135, followed by Play key 115. In response to such a key combination, processor 205 retrieves data from segment I (corresponding to the count shown on display 113b) of memory block 403 (corresponding to the second, call purpose attribute). System 100 then announces through speaker 111 in a synthesized voice, "One. Homework." Immediately thereafter, the count shown on display 113b increments from "1" to "2". Accordingly, system 100 announces, "Two. Auto repair."

As soon as the user identifies the second message as the message of interest, the user may press Stop key 117 connected to operating circuitry 203 to halt the on-going call purpose announcement process. As a result, display 113b stops at the current count (i.e., "2"). Otherwise, the process continues until the count shown on display 113b matches that on display 113a to allow the user to review the call purpose of each message. If that is the case, the count shown on display 113b increments from "2" to "3", corresponding to the last message in this example. System 100 then announces, "Three. Home insurance." The call purpose announcement process thereafter comes to an end. Since the user at this point has found out that the second message is the message of interest, he/she wants to retrieve that message. To that end, the user needs to press Backward key 119 once to decrease the count on display 113b from "3" to "2" corresponding to the second message.

In any event, once display 113b shows the count "2", the user may listen to the details of the second message by pressing MD key 137, followed by Play key 115. Accordingly, processor 205 retrieves the data representing MD #2 from segment J (corresponding to the second message) of memory block 405 (corresponding to the details part of a message). The message details MD #2 are then announced in a synthesized voice. In the event that the message details do not reveal the caller's name and the user wants to know it, the user may review the first, name attribute of the message by pressing A1 key 131 corresponding thereto, followed by Play key 115. Accordingly, processor 205 retrieves the data representing "Alex" from segment J of memory block 401 (corresponding to the first attribute of a message). The announcement "2. Alex." is then synthesized. As an alternative, the user may press Play key 115 alone in the first place to listen to the complete message including the first attribute, second attribute and message details, in that order. If that is the case, processor 205 retrieves the data from segment J of each of memory blocks 401, 403 and 405. The complete message is then announced in a synthesized voice.

Other keys on system 100 include Forward key 121 and Delete key 123. Key 121 performs an inverse function to Backward key 119. Key 123 enables the user to delete the current message identified by display 113b. When a message is deleted, the respective counts on displays 113a and 113b would decrease by one. In addition, the ensemble of memory segments corresponding to the deleted message would be relinquished and overwritten by a new message.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, it is disclosed that system 100 includes A1 key 131 and A2 key 135 to implement the invention based on two message attributes. It will be appreciated that system 100 will include more or fewer such attribute keys to realize more or fewer message attributes. Moreover, it will be appreciated that the actual number of message attributes used may be selected, and thus perhaps different from the number of available attribute keys. For example, the selected number of attributes used in the daytime may be one or more, in anticipation of a high volume of messages. By contrast, it may be one or even none at night, in anticipation of much fewer messages.

In addition, in the illustrative embodiment, program memory 209 and data memory 207 in system 100 are physically separate. Alternatively, they may be a shared memory space.

Moreover, although program memory 209 is illustratively a ROM, it may alternatively be an electrically erasable programmable read-only memory (EEPROM) to allow for software version updates. The program memory may also include a RAM to boost speed.

Further, although data memory 207 is illustrated as an SRAM, it may include a ROM or EEPROM for storing announcements, and may include an EEPROM for storing callers' messages. The use of a conventional "audio RAM" (ARAM) in lieu of the present SRAM is also a possibility.

Still further, the messages and announcements may be stored in system 100 in any suitable speech format, typically a compressed format to save memory space. The messages and announcements may alternatively be stored in ASCII format, for example, to allow for entering the desired information from a keyboard or other input device.

In addition, in the illustrative embodiment, system 100 is a stand-alone system. It will be appreciated that a person skilled in the art will incorporate the hardware and/or software of system 100, in whole or in part, into a telephone unit or a personal computer (PC) affording the telephone functionality. In the latter case, a microphone and speakers are included in the video monitor for example. The invention may then be conveniently implemented using the memory and logic available in the PC, either on the main circuit board or as a plug in unit.

While a conventional analog telephone indicated above may be used as the telephone equipment connected to system 100, a digital telephone comprising analog-to-digital and digital-to-analog converters may alternatively be used. For example, an ISDN (integrated services digital network) phone may be used, or alternatively a phone connected to a broadband network or an Internet provider. The "ringing" and incoming call receipt functions may be modified from those provided by a conventional analog phone, if desired. For example, an incoming call may be recognized as a particular digital bit sequence rather than an analog ringing voltage, as appropriate to the particular implementation.

Finally, although system 100 as disclosed is embodied in the form of various discrete functional blocks, the system could equally well be embodied in an arrangement in which the functions of any one or more of those blocks or indeed, all of the functions thereof, are realized, for example, by one or more appropriately programmed processors or devices.

I claim:

1. A system for answering a telephone call comprising:
   a circuit for receiving at least one message from a caller of the call, the message including a plurality of attributes of the message, the attributes having contents provided by the caller;
   a memory for storing the message;
   a selecting element for selecting one of the plurality of attributes of the stored message; and
   an operating element for reviewing the content of the selected attribute provided by the caller.

2. The system of claim 1 further comprising an audio interface for prompting the caller for said plurality of attributes.

3. The system of claim 1 wherein one of said plurality of attributes includes information on an identity of the caller.

4. The system of claim 1 wherein one of said plurality of attributes includes information on a purpose of the call.

5. The system of claim 1 wherein at least one of the plurality of attributes is stored in a first selected memory space in the memory, and the rest of the message is stored in a second selected memory space in the memory.

6. The system of claim 5 wherein the first selected memory space and second selected memory space are associated with the message.

7. The system of claim 1 wherein the operating element includes a selector for selecting at least part of the message other than the selected attribute to be reviewed.

8. The system of claim 7 wherein the at least part of the message includes a second attribute of the message.

9. The system of claim 1 further comprising telephone equipment for transmitting and receiving telephone calls.

10. The system of claim 9 wherein said telephone equipment is a digital telephone comprising an analog-to digital converter and a digital-to-analog converter.

11. The system of claim 1 further comprising a personal computer (PC).

12. A system for answering telephone calls comprising:
    an interface for receiving a plurality of messages from callers of the telephone calls, each message including one or more attributes and details thereof, the attributes of the plurality of messages being stored according to a predetermined number of categories;
    a selecting element for selecting one of the predetermined number of categories of attributes for a review thereof;
    an operating element for identifying any one of the attributes in the selected category as being of interest based on a content of the attribute which is provided by one of the callers; and
    a processor for accessing a selected part of the message having the attribute of interest.

13. The system of claim 12 wherein said one or more attributes include an attribute concerning an identity of a telephone caller.

14. The system of claim 12 further comprising a first selected memory space for storing said attributes of the plurality of messages and a second selected memory space for storing the associated message details.

15. The system of claim 12 wherein said operating element includes an audio interface for announcing information concerning the attributes in the selected category.

16. The system of claim 12 further comprising telephone equipment for transmitting and receiving telephone calls.

17. The system of claim 16 wherein said telephone equipment is a digital telephone comprising an analog-to-digital converter and a digital-to-analog converter.

18. The system of claim 12 further comprises a personal computer (PC).

19. A method for use in a telephone answering system comprising:
    receiving at least one message from a caller of the call, the message including a plurality of attributes of the message, the attributes having contents provided by the caller;
    storing the message;
    selecting one of the plurality of attributes of the stored message; and
    reviewing the content of the selected attribute provided by the caller.

20. The method of claim 19 further comprising prompting the caller for said plurality of attributes.

21. The method of claim 19 wherein one of said plurality of attributes includes information on an identity of the caller.

22. The method of claim 19 wherein one of said plurality of attributes includes information on a purpose of the call.

23. The method of claim 19 wherein at least one of the plurality of attributes is stored in a first selected memory space associated with the message, and the rest of the message is stored in a second selected memory space associated with the message.

24. The method of claim 19 further comprising selecting at least part of the message other than the selected attribute to be reviewed.

25. The method of claim 24 wherein the at least part of the message includes a second attribute of the message.

26. A method for use in a system for answering telephone calls comprising:
    receiving a plurality of messages from callers of the telephone calls, each message including one or more attributes and details thereof;
    storing the attributes of the plurality of messages according to a predetermined number of categories;
    selecting one of the predetermined number of categories of attributes for a review thereof;
    identifying any one of the attributes in the selected category as being of interest based on a content of the attribute which is provided by one of the callers; and
    accessing a selected part of the message having the attribute of interest.

27. The method of claim 26 wherein said one or more attributes include an attribute concerning an identity of a telephone caller.

28. The method of claim 26 wherein said attributes of the plurality of messages are stored in a first selected memory space and the associated message details are stored in a second selected memory space.

29. The method of claim 26 further comprising announcing information concerning the attributes in the selected category.

* * * * *